US007950692B2

(12) United States Patent
Clark et al.

(10) Patent No.: US 7,950,692 B2
(45) Date of Patent: May 31, 2011

(54) GAS GENERATION DEVICE WITH CONSUMABLE IGNITOR TUBE

(75) Inventors: Marcus T. Clark, Kaysville, UT (US); Nyle K. Longhurst, Layton, UT (US); Steve Olsen, Ogden, UT (US); Patti Quinney, Layton, UT (US)

(73) Assignee: Autoliv ASP, Inc., Ogden, UT (US)

(*) Notice: Subject to any disclaimer, the term of this patent is extended or adjusted under 35 U.S.C. 154(b) by 322 days.

(21) Appl. No.: 11/956,514

(22) Filed: Dec. 14, 2007

(65) Prior Publication Data

US 2009/0152851 A1 Jun. 18, 2009

(51) Int. Cl.
*B60R 21/26* (2006.01)

(52) U.S. Cl. .................................................... 280/741

(58) Field of Classification Search .................. 280/736, 280/741; 102/530, 531

See application file for complete search history.

(56) References Cited

U.S. PATENT DOCUMENTS

| | | | | |
|---|---|---|---|---|
| 5,109,772 | A * | 5/1992 | Cunningham et al. | 102/275.11 |
| 5,529,335 | A * | 6/1996 | Bohmler | 280/741 |
| 6,176,517 | B1 | 1/2001 | Hamilton et al. | |
| 6,224,099 | B1 * | 5/2001 | Nielson et al. | 280/741 |
| 6,805,377 | B2 | 10/2004 | Krupp et al. | |
| 7,192,055 | B2 * | 3/2007 | Stevens et al. | 280/741 |

FOREIGN PATENT DOCUMENTS

| | | | |
|---|---|---|---|
| JP | 6-298035 | * 4/1993 | 280/736 |

* cited by examiner

*Primary Examiner* — Eric Culbreth

(74) *Attorney, Agent, or Firm* — Harness, Dickey & Pierce, P.L.C.

(57) ABSTRACT

A gas generation device includes an elongated housing and an ignitor tube. The elongated housing defines a generant bed. The ignitor tube is disposed within the housing and extends at least substantially along the entire length of the generant bed. The ignitor tube defines an unobstructed path for ignitor gases to travel into the generant bed. The ignitor tube is constructed of a consumable material.

15 Claims, 5 Drawing Sheets

28
30
30
18
24

GAS GENERATION DEVICE WITH CONSUMABLE IGNITOR TUBE

FIELD

The present disclosure generally relates to gas generation devices. More particularly, the present disclosure relates to gas generation devices with consumable ignitor tubes.

BACKGROUND

The statements in this section merely provide background information related to the present disclosure and may not constitute prior art.

Pyrotechnic inflators for vehicle airbags typically have an initiator that combusts very rapidly to produce heated ignition gas. The ignition gas typically causes ignition of a generant stored adjacent to the initiator. In turn, the generant generates the main portion of the inflation gas to inflate the airbag.

Various arrangements may be used to distribute heated ignition gas to a generant. In one example, an ignitor tube distributes gas from a squib to generant disclosed in a generant bed. One suitable arrangement is shown and described in commonly owned U.S. Pat. No. 6,935,655. U.S. Pat. No. 6,935,655 is hereby incorporated by reference as if fully set forth herein.

While conventional gas generation devices, including the arrangement shown and described in U.S. Pat. No. 6,935,655, have proven to be adequate for their intended purposes, continued advancement in the relevant field remains desirable.

SUMMARY

In accordance with one aspect, the present teachings provide a gas generation device including an elongated housing and an ignitor tube. The elongated housing defines a generant bed. The ignitor tube is disposed within the housing and extends at least substantially along the entire length of the generant bed. The ignitor tube defines an unobstructed path for ignitor gases to travel into the generant bed. The ignitor tube is constructed of a consumable material.

In accordance with another aspect, the present teachings provide a gas generation device for an inflatable airbag. The gas generation device includes a housing and an ignitor tube. The housing is generally cylindrical and has maximum outside diameter. A generant bed is defined by the housing. The ignitor is disposed within the housing such that the generant bed is circumferentially positioned between the ignitor tube and the housing. The ignitor tube is constructed of a consumable material and extends substantially along the entire length of the generant bed. The ignitor tube defines an unobstructed path for ignitor gases to travel into the generant bed substantially along the length of the generant bed. A ratio of a length of the ignitor tube and the maximum outside diameter of the housing is at least approximately 4:1.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DESCRIPTION OF VARIOUS ASPECTS

The present teachings will be best understood by reference to the drawings, wherein like parts are designated by like numerals throughout. It will be readily understood that the components of the present teachings, as generally described and illustrated in the figures herein, could be arranged and designed in a wide variety of different configurations. Thus, the following description is not intended to limit the scope of the invention, as claimed, but is merely exemplary in nature and is not intended to limit the present disclosure, application, or uses.

Figure 1:
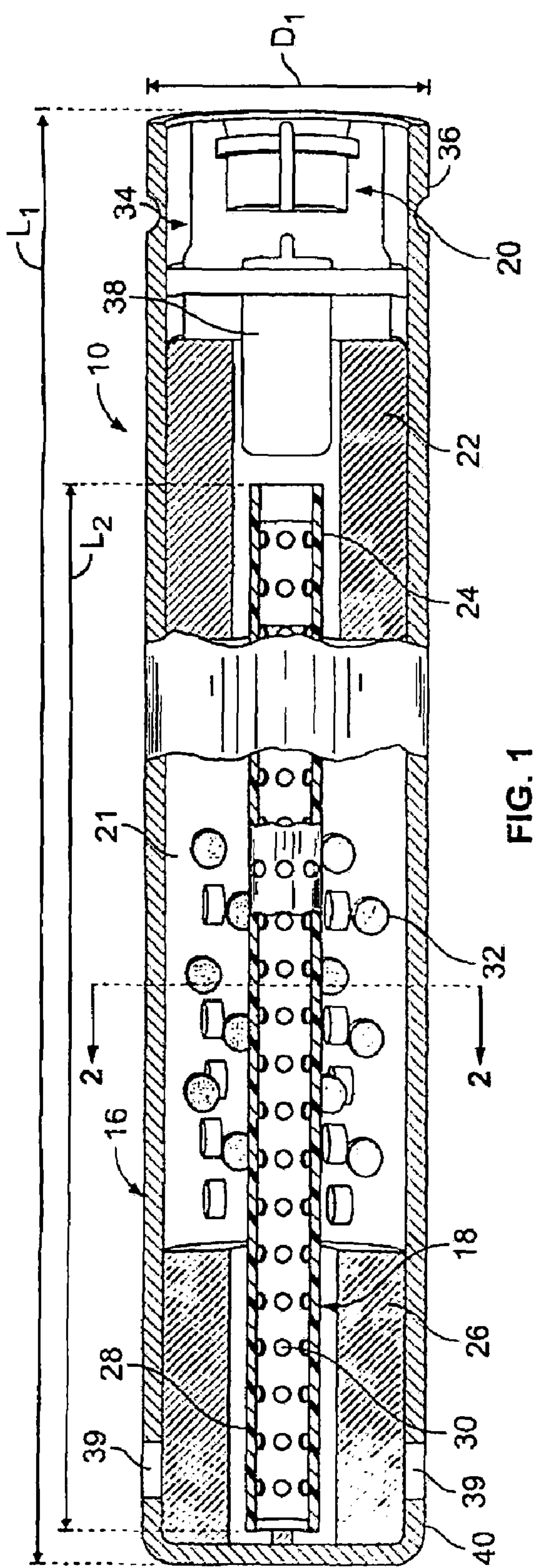
FIG. 1 is a side view of a gas generation device with a consumable ignitor tube in accordance with the present teachings, the gas generation device shown in partial cross section.
Figure 2:
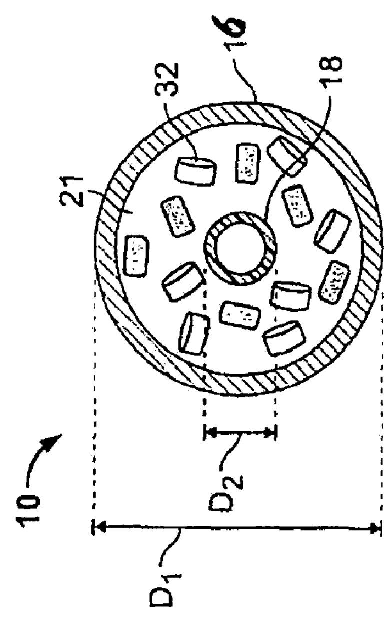
FIG. 2 is a cross-sectional view taken along the line 2-2 of FIG. 1.
Figure 3:
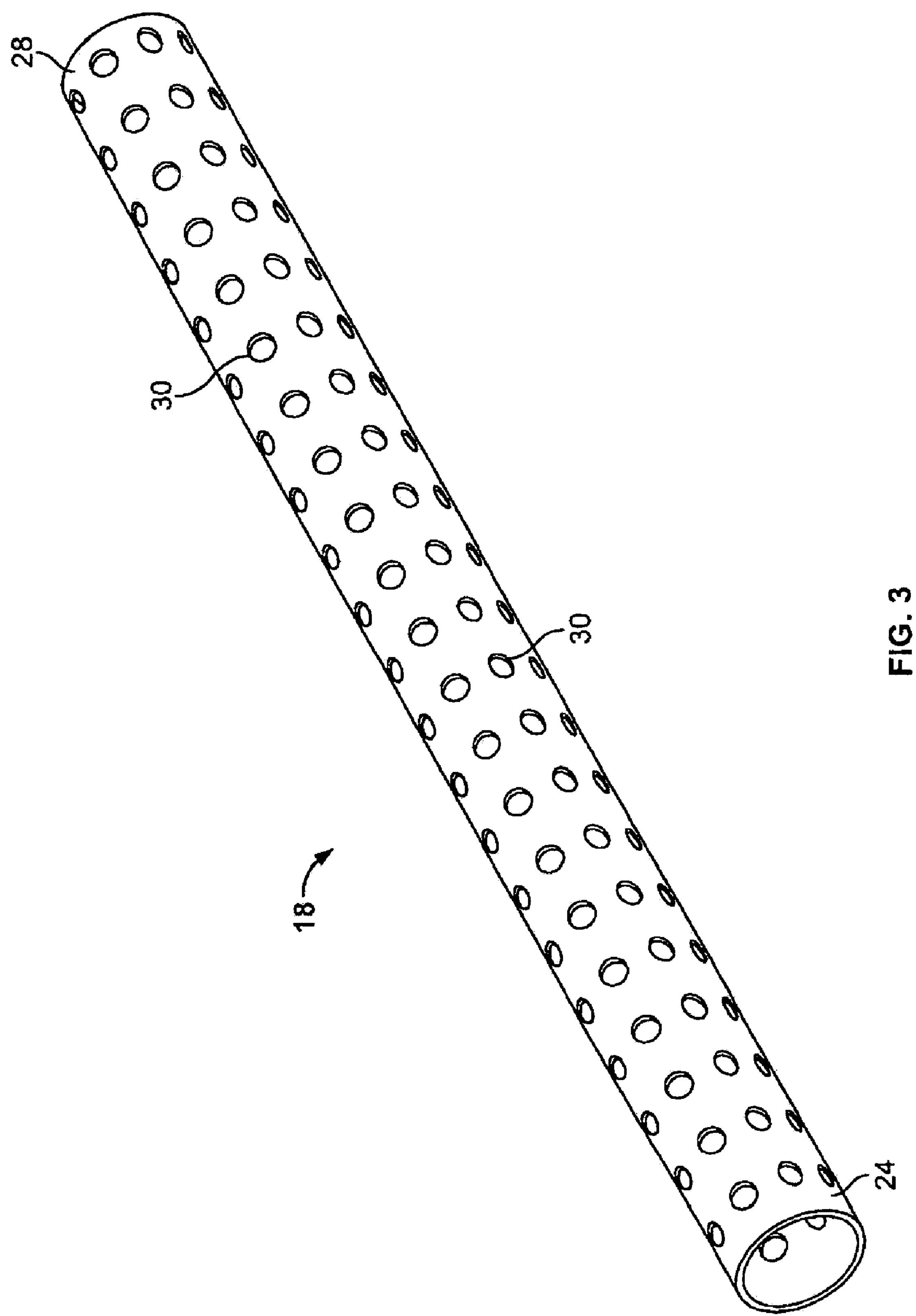
FIG. 3 is a perspective view of the consumable ignitor tube of FIG. 1, shown removed from the gas generation device for purposes of illustration.
Figure 4:
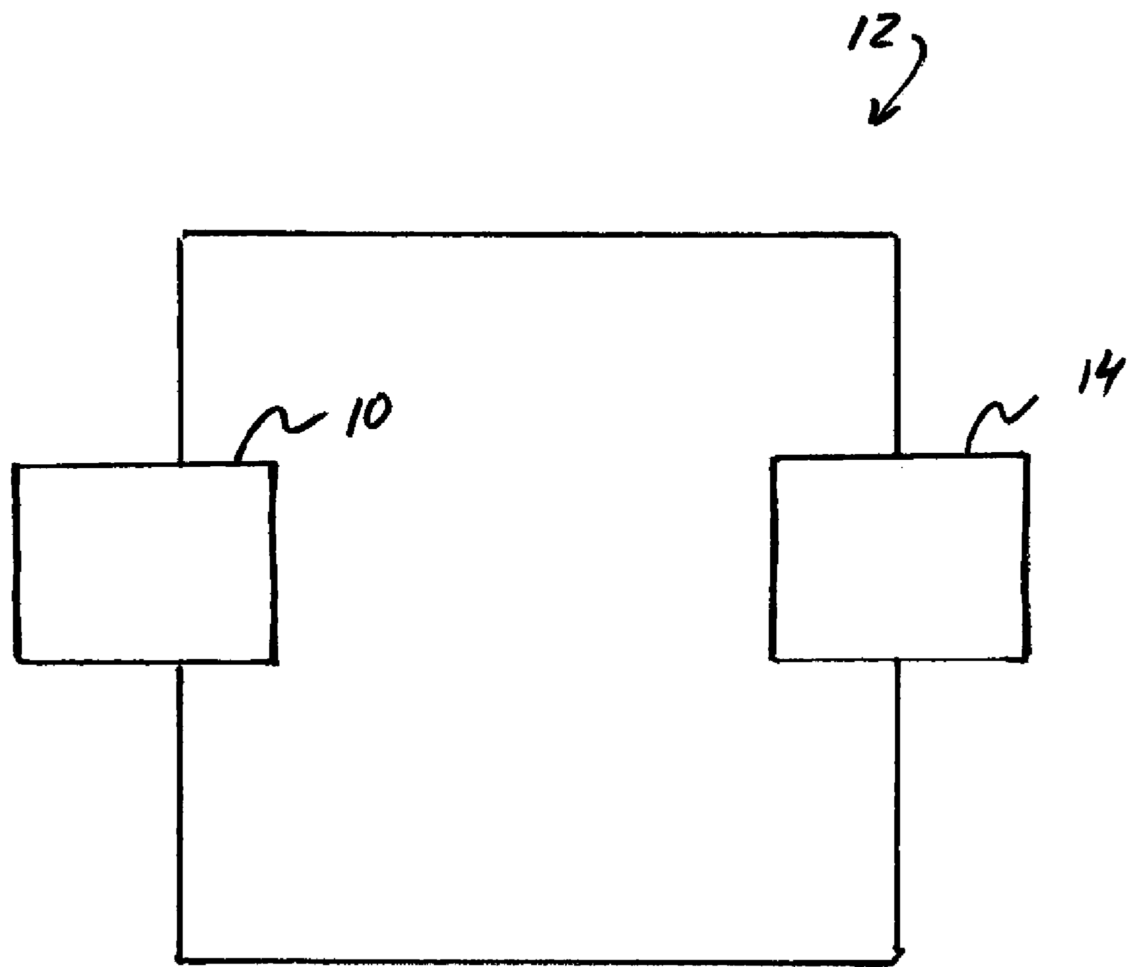
FIG. 4 is a schematic view illustrating an airbag system incorporating a gas generation device in accordance with the present teachings.

With general reference to FIGS. 1-3 of the drawings, a gas generation device in accordance with the present teachings is illustrated and generally identified at reference character 10. As particularly shown in the schematic view of FIG. 4, the gas generation device may be incorporated into an airbag system 12 of a motor vehicle for inflating an airbag 14. Those of skill in the art will recognize that the present teaching may be readily applied to a wide variety of airbag types, including driver's and passenger's side front impact airbags, knee bolsters, inflatable curtains, and overhead airbags.

The gas generation device 10 may generally include a housing 16, a ignitor tube 18 and a plug/initiator assembly 20. The housing 16 may have a generally circular cross section and may have an elongated configuration with a length $L_1$ substantially greater than a diameter $D_1$. While not limited thereto, the housing 16 may be formed of steel by stamping, casting, extension or any other suitable procedure or suitable material.

The ignitor tube 18 is disposed in the housing 16 and positioned such that a generant bed 21 is defined circumferentially between the ignitor tube 18 and the housing 16. A first mesh filter pack 22 may circumferentially surround a first end 24 of the ignitor tube 18. A second mesh filter pack 26 may circumferentially surround a second end 28 of the ignitor tube 18. While not limited thereto, the mesh filter packs 22 and 26 may be constructed of wire mesh, wrapped screen, wrapped expanded metal or the like.

The ignitor tube 18 may have a generally circular cross section and may have an elongated configuration with a length $L_2$ substantially greater than a diameter $D_2$. While not limited thereto, the ignitor tube 18 may have a length $L_2$ of approximately 90 mm and a diameter $D_2$ of approximately 5 mm.

As illustrated in FIG. 1, for example, the ignitor tube 18 may be formed to include a plurality of perforations or holes 30 substantially along its entire length. The ignitor tube 18 may extend at least substantially along the entire length of the generant bed 21. As illustrated, the ignitor tube 18 extends completely along the length of the generant bed 21. Alternatively, however, the ignitor tube 18 may extend only partially into the generant bed, as required.

The ignitor tube 18 may be constructed of a consumable material. In particular applications, the ignitor tube 18 may be constructed of a pyrotechnic autoignition material. In this regard, one suitable material for constructing the ignitor tube 18 would include a rolled sheet of nitrocellulose. In other applications, the ignitor tube 18 may be constructed of paper, plastic or other suitable material that may be substantially consumed during operation of the gas generation device 10.

The generant bed 21 may be filled with a generant 32. The generant 32 may be manufactured through known chemical methods and may consist of pellets of pyrotechnic material. The pellets may have a generally cylindrical shape or be of any other suitable shape. One suitable generant 32 is commercially available from Autoliv ASP as part number P610877902A.

Insofar as the present teachings are concerned, the plug/initiator assembly 20 may be disposed within the housing 16 approximate a first end 36 thereof. The plug/initiator assembly 20 may include an initiation charge integrated with a plug housing. In other applications, an initiator may be retained within a separate plug housing. A combustion head 38 of the plug/initiator assembly 20 may include a pyrotechnic charge designed to produce an ignition gas to ignite the generant 32 independently of any separate ignitor material. The combustion head 38 is disposed approximate the first end 24 of the ignitor tube 18. Rather, when used in conjunction with the ignitor tube 18, one suitable plug/initiator assembly 20 is manufactured and/or sold as part number 604659700D, from Autoliv ASP.

The plug/initiator assembly 20 and activation thereof will be understood to be conventional unless otherwise described herein. Briefly, in response to detection of a vehicle collision, an activation signal is transmitted to pins of the plug/initiator assembly 20. The activation signal is conveyed to the combustion head 38 via the pins. This activation signal ignites a pyrotechnic charge (not shown) within the combustion head 38. The pyrotechnic charge within the combustion head 38 substantially vaporizes to produce the heated ignition gas. In this application, the term "ignition gas" refers to gas at a temperature and volume suitable for initiating combustion of the gas generant material 32.

The ignition gas generated by the combustion head 38 travels down a path defined by the hollow ignitor tube 18. This path is devoid of a booster charge and therefore unimpeded. The perforations 30 along the length of the ignitor tube 18 allow the initiator gas to exit into the generant bed 21. In this manner, the generant bed 21 may be provided with an evenly distributed ignition. The consumable material of the ignitor tube 18 effectively results in destruction of the ignitor tube 18. Within a few milliseconds, substantially all the generant 32 is burning. Inflation gases are forced through the second mesh filter pack 26 and exit openings 39 provided in a second end 40 of the housing 16. The generant 32 produces inflation gas at a rate sufficient to inflate the airbag 14 to cushion a vehicle occupant from a vehicle structural member prior to impact of the occupant with the structural member.

Figure 5:
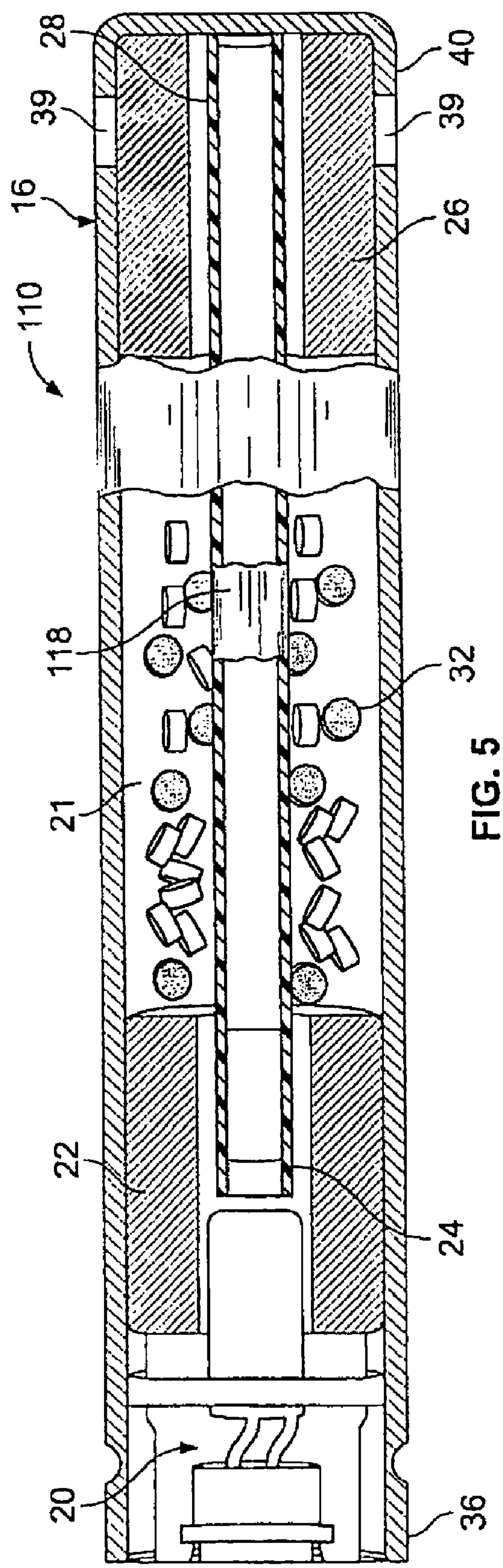
FIG. 5 is a side view of another gas generation device with a consumable ignitor tube in accordance with the present teachings, the gas generation device shown in partial cross section.
Figure 6:
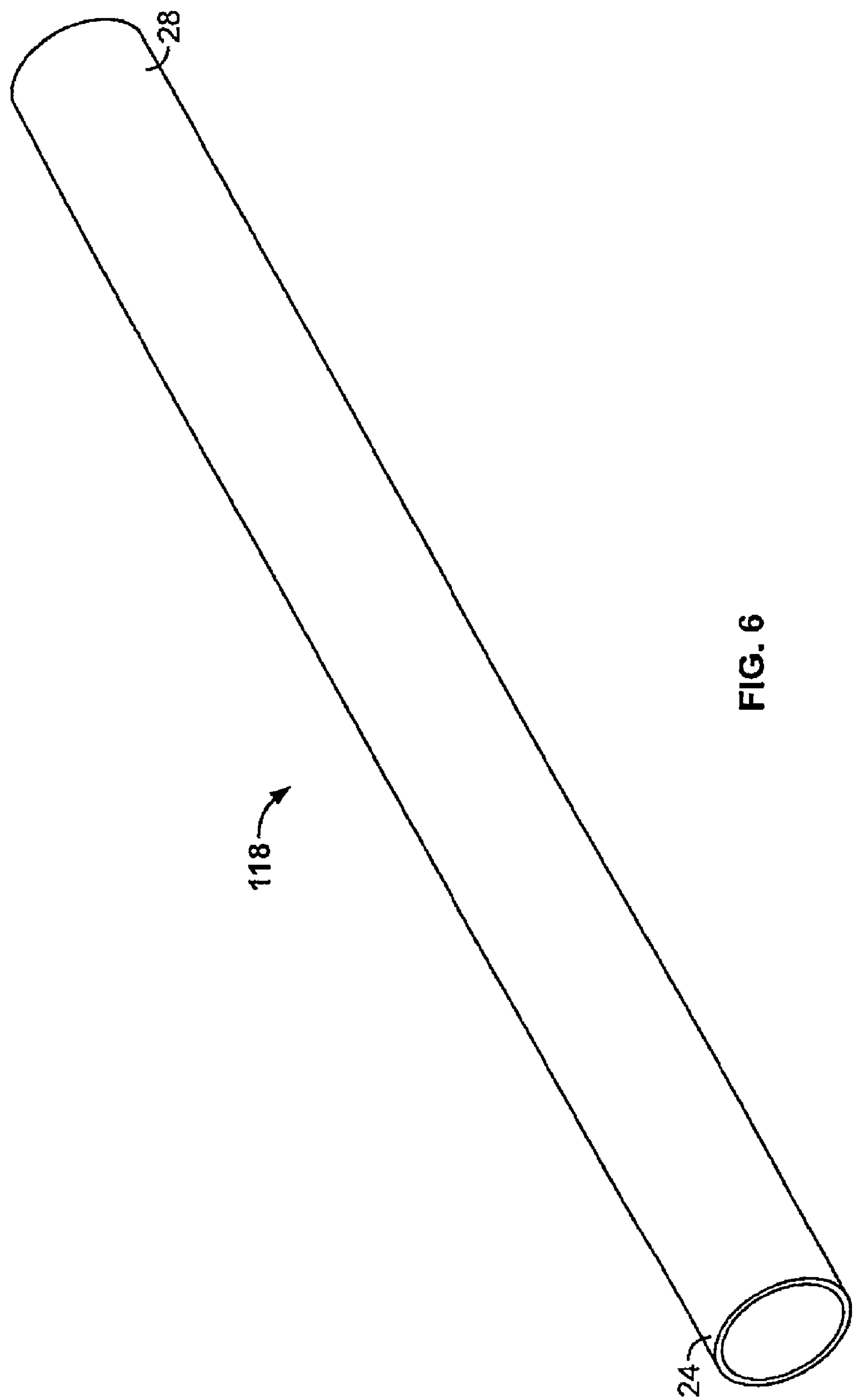
FIG. 6 is a perspective view of the consumable ignitor tube of FIG. 5.

Turning to FIG. 5, another gas generation device constructed with the present teachings is illustrated and identified at reference character 110. It will be understood that like reference characters are used to identify elements similar to those previously introduced. The gas generation device 110 differs from the gas generation device 10 in that it incorporates a ignitor tube 118 which is devoid of perforations. The ignition gas of the plug/initiator assembly 20 may be sufficient to effectively destroy the consumable ignitor tube 18 and thereby provide for the uniform distribution of initiator gases without the need for perforations or holes.

While specific examples have been described in the specification and illustrated in the drawings, it will be understood by those skilled in the art that various changes may be made and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof. Therefore, it may be intended that the present teachings not be limited to the particular examples illustrated by the drawings and described in the specification as the best mode of presently contemplated for carrying out the present teachings but that the scope of the present disclosure will include any embodiments following within the foregoing description and any appended claims.

What is claimed is:

1. A gas generation device comprising:
- an elongated housing defining a generant bed including a gas generant material;
- an ignitor tube disposed within the housing and extending at least substantially along the entire length of the generant bed, the ignitor tube defining an unobstructed path for ignitor gases to travel into the generant bed, the ignitor tube constructed of a consumable material; and
- a combustion head proximate to and spaced from an end of the ignitor tube for producing an ignition gas to ignite the gas generant material.

2. The gas generation device of claim 1, wherein the ignitor tube is devoid of perforations.

3. The gas generation device of claim 1, wherein the ignitor tube is constructed of plastic.

4. The gas generation device of claim 1, wherein the ignitor tube is constructed of paper.

5. The gas generation device of claim 1, wherein the ignitor tube is made of a pyrotechnic autoignition material.

6. The gas generation device of claim 1, wherein the ignitor tube is made of a rolled sheet of nitrocellulose.

7. The gas generation device of claim 1, wherein the unobstructed path is devoid of a booster charge.

8. The gas generation device of claim 1, in combination with an airbag system.

9. A gas generation device of comprising:
- an elongated housing defining a generant bed including a gas generant material;
- an ignitor tube disposed within the housing and extending at least substantially along the entire length of the generant bed, the ignitor tube defining an unobstructed path for ignitor gases to travel into the generant bed, the ignitor tube constructed of a consumable material; and
- a combustion head proximate an end of the ignitor tube for producing an ignition gas to ignite the gas generant material independently of any separate ignitor material;
- wherein the ignitor tube includes a plurality of perforations through which the ignition gas may pass to directly ignite the gas generant material.

10. The gas generation device of claim 9, wherein the perforations of the plurality of perforations at least substantially extend along the length of the ignitor tube.

11. A gas generation device for an inflatable airbag, the gas generation device comprising:

a generally cylindrical housing having a maximum outside diameter;

a generant bed defined by the housing and containing a gas generant material;

an ignitor tube disposed within the housing such that the generant bed is circumferentially positioned between the ignitor tube and the housing, the ignitor tube constructed of a consumable material and extending substantially along the entire length of the generant bed, the ignitor tube defining an unobstructed path for ignitor gases to travel into the generant bed substantially along the length of the generant bed; and a combustion head proximate to and spaced from an end of the ignitor tube for producing an ignition gas to ignite the gas generant material.

12. The gas generation device of claim 11, wherein the ignitor tube is made of a pyrotechnic material.

13. The gas generation device of claim 11, in combination with the airbag system.

14. An airbag system comprising:

an inflatable airbag; and a gas generation device including:

a generally cylindrical housing having a maximum outside diameter;

a generant bed defined by the housing and including a gas generant material;

an ignitor tube disposed within the housing such that the generant bed is circumferentially positioned between the ignitor tube and the housing; the ignitor tube constructed of a consumable material and extending substantially along the entire length of the generant bed, the ignitor tube defining an unobstructed path for ignitor gases to travel into the generant bed substantially along the length of the generant bed; and a combustion head proximate to and spaced from an end of the ignitor tube for producing an ignition gas to ignite the gas generant material.

15. The airbag system of claim 14, wherein the ignitor tube is made of a pyrotechnic material.

* * * * *